Figure 2:
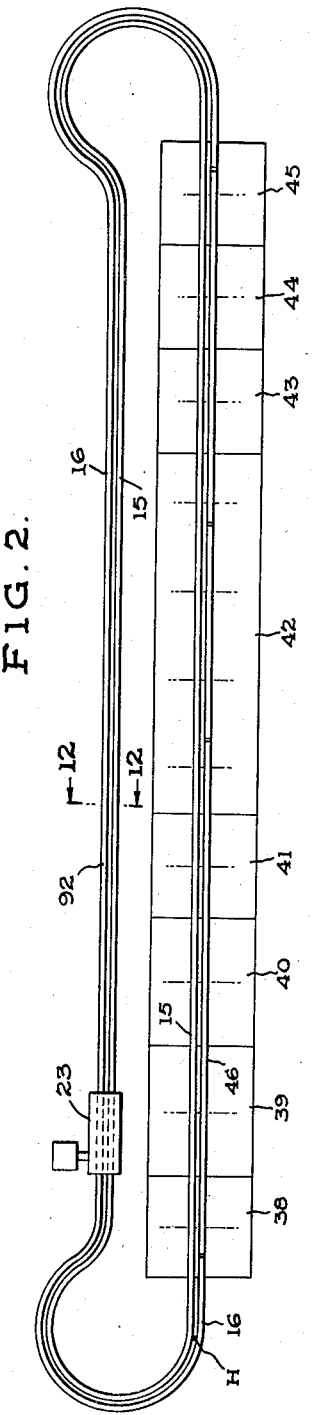

Jan. 12, 1960  A. E. HAUCK ET AL  2,921,008
PROCESSING CONVEYOR APPARATUS
Filed Feb. 1, 1957  5 Sheets-Sheet 1

INVENTORS
ARTHUR E. HAUCK
PAUL A. HAUCK
BY
ATTORNEY

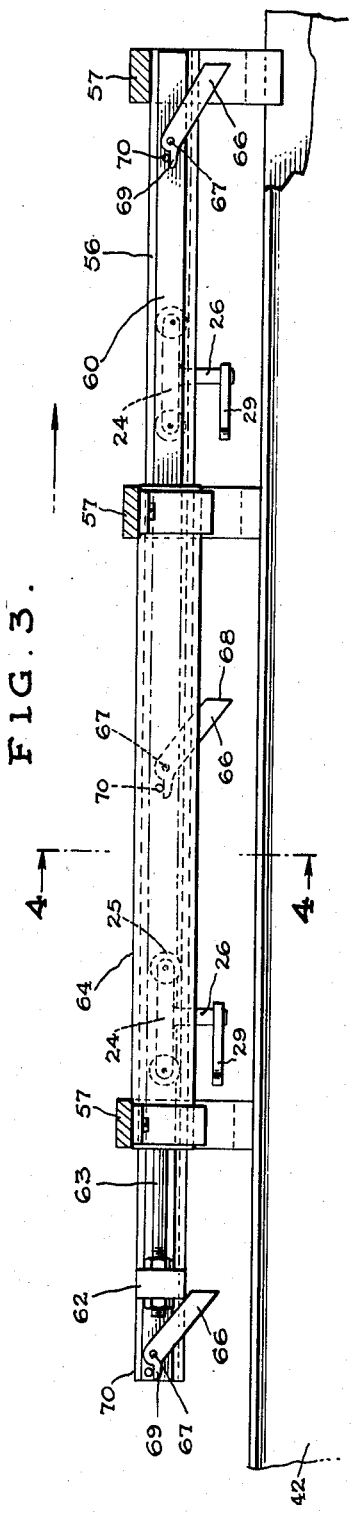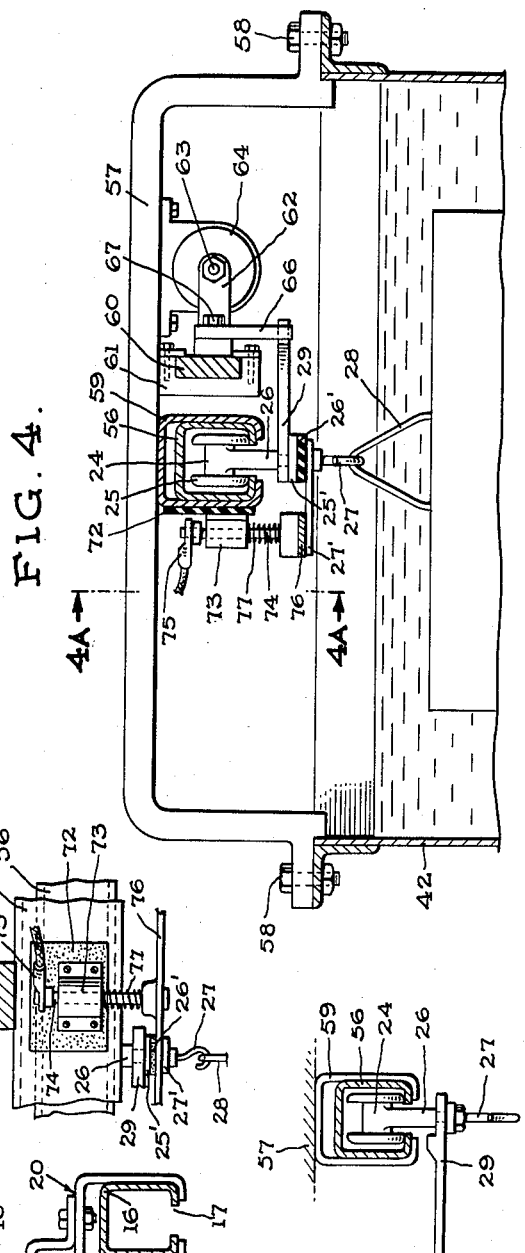
Jan. 12, 1960 A. E. HAUCK ET AL 2,921,008
PROCESSING CONVEYOR APPARATUS
Filed Feb. 1, 1957 5 Sheets-Sheet 2
INVENTORS
ARTHUR E. HAUCK
PAUL A. HAUCK
ATTORNEY

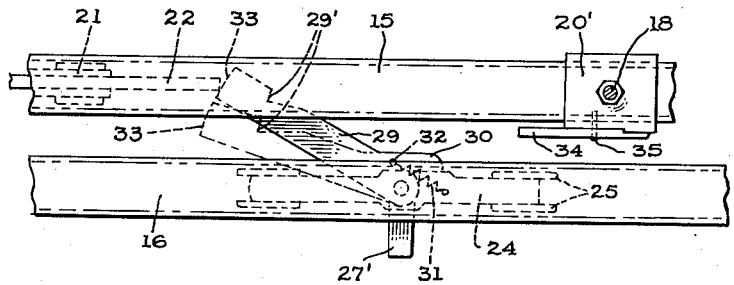
FIG. 5.
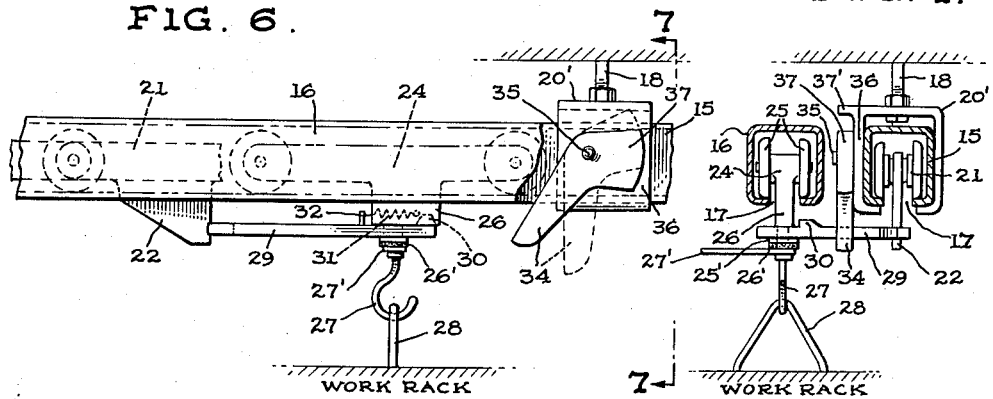
FIG. 6.
FIG. 7.
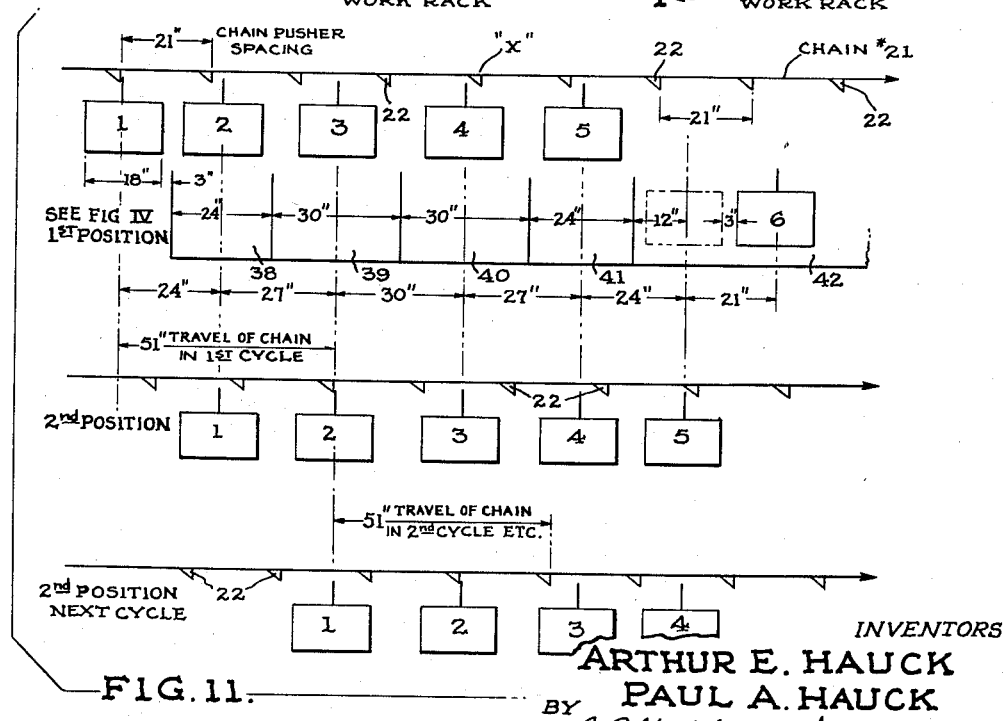
FIG. 11.
INVENTORS
ARTHUR E. HAUCK
PAUL A. HAUCK
BY
ATTORNEY Jan. 12, 1960  A. E. HAUCK ET AL  2,921,008
PROCESSING CONVEYOR APPARATUS
Filed Feb. 1, 1957  5 Sheets-Sheet 5
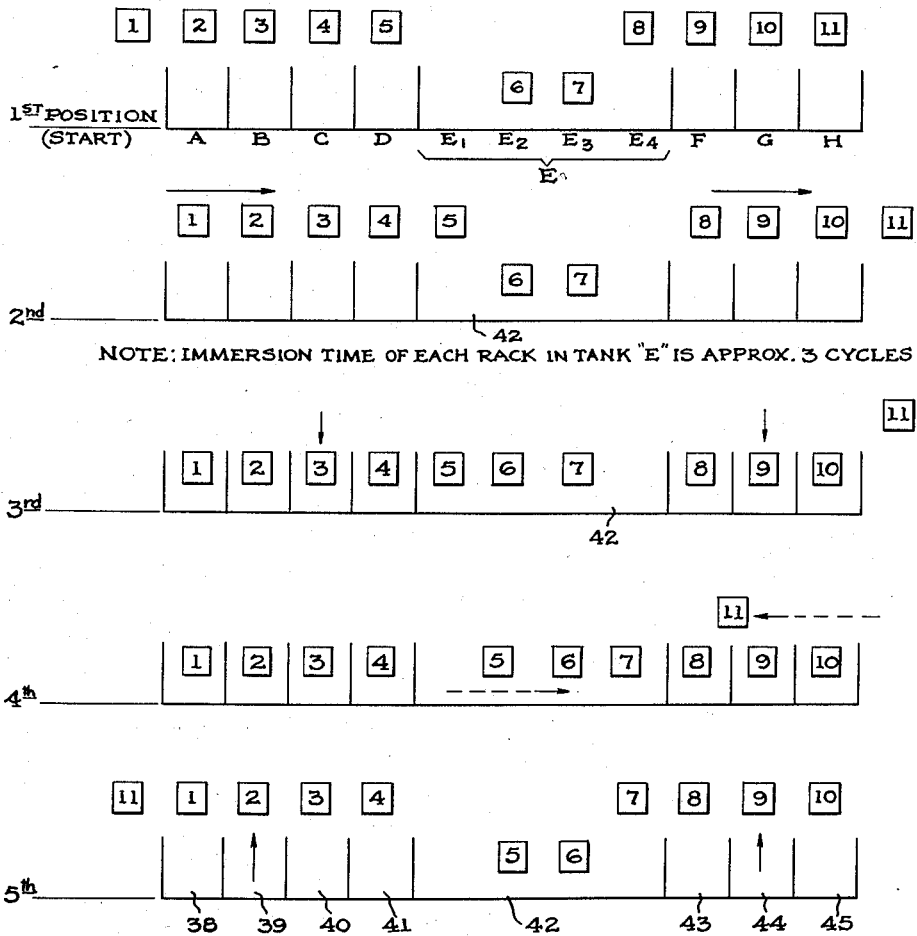
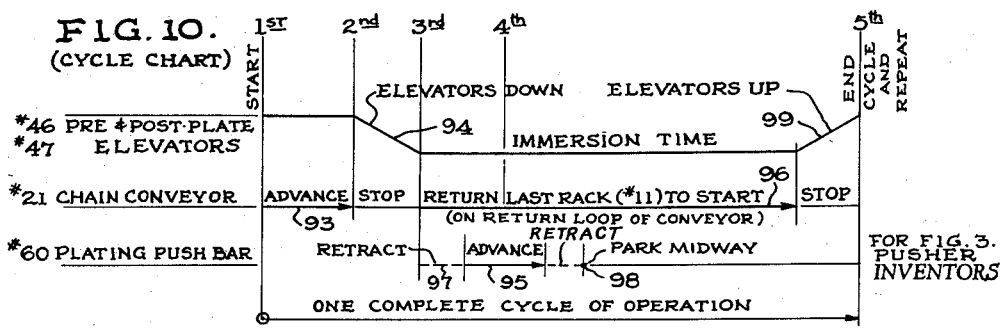
ARTHUR E. HAUCK.
PAUL A. HAUCK.
BY B. P. Fishburne, Jr. ATTORNEY

United States Patent Office 2,921,008
Patented Jan. 12, 1960

2,921,008

PROCESSING CONVEYOR APPARATUS

Arthur E. Hauck, Bound Brook, and Paul A. Hauck, Union, N.J.

Application February 1, 1957, Serial No. 637,648

16 Claims. (Cl. 204—203)

The present invention relates to processing conveyor apparatus.

An object of the invention is to provide a chain pusher and free trolley type of conveyor, particularly adapted for electroplating and similar processes where the work must be advanced from station to station during the process and also elevated and lowered at certain stations.

A further object of the invention is the provision of a relatively simplified and inexpensive conveyor system for electroplating plants and the like, which dispenses entirely with the need for the bulky, heavy and extremely expensive machinery commonly employed at the present time for this purpose.

Another object is to provide a conveyor system of the above-mentioned character embodying largely elements of conventional construction, readily available on the market, but adapted in a novel manner to the electroplating or like processing system.

A further object is to provide a conveyor which may be in the form of a closed continuous loop for electroplating or the like, or which may be constructed to follow substantially any path and to have switch connections with other conveyors or be a part of a plant-wide conveyor system, receiving work from one section of a plant for electroplating or the like and then advancing the work onto another part of the plant.

A further and more specific object is to provide a conveyor system which enables the work to be advanced one station during each intermittent cycle of operation of the pusher chain, even where the work stations are not spaced apart uniformly along the length of the conveyor but have varying distances between them.

A further important object is to provide a conveyor having a construction and mode of operation which will eliminate entirely conveyor chain stretch and length variation problems, presently very difficult to cope with in conventional conveyor systems.

Another object is to provide novel and simplified means for disengaging the free trolleys from the pushing conveyor chain so that sections of the conveyor track carrying certain trolleys can be lowered and elevated at certain work stations and the free trolleys re-engaged with the conveyor chain with facility.

Another important object is the provision in a conveyor of the above-mentioned type of chain pusher lugs and track mounted stop elements spaced relative to each other and to the work stations in such a manner that it matters not where the chain pusher elements are located with respect to the work stations when the conveyor chain starts or stops during the cycle of operation, the conveyor being adapted to advance the work units various required distances without confusion or interference.

Still another object is to provide a conveyor which may conveniently be in the form of an overhead ceiling supported track system substantially free of all structure between the ceiling and floor except for the processing tanks used in electroplating and the like, which tanks may be recessed into and flush with the floor, if desired, and in which case there will be no structure at all between the floor and the overhead simplified track system.

Other objects and advantages of the invention will be apparent during the course of the following detailed description.

Figure 1:
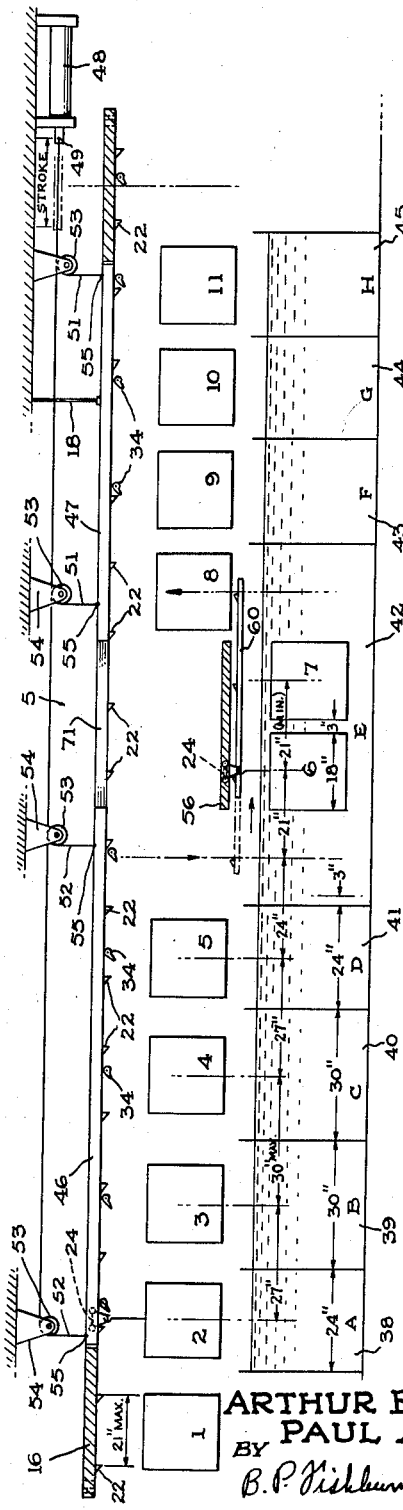
Figure 7A:
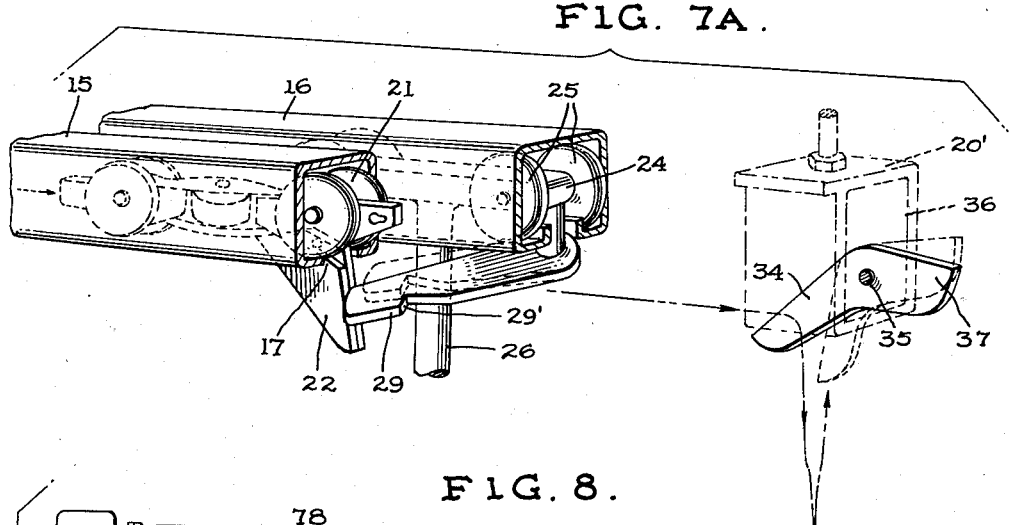
Figure 8:
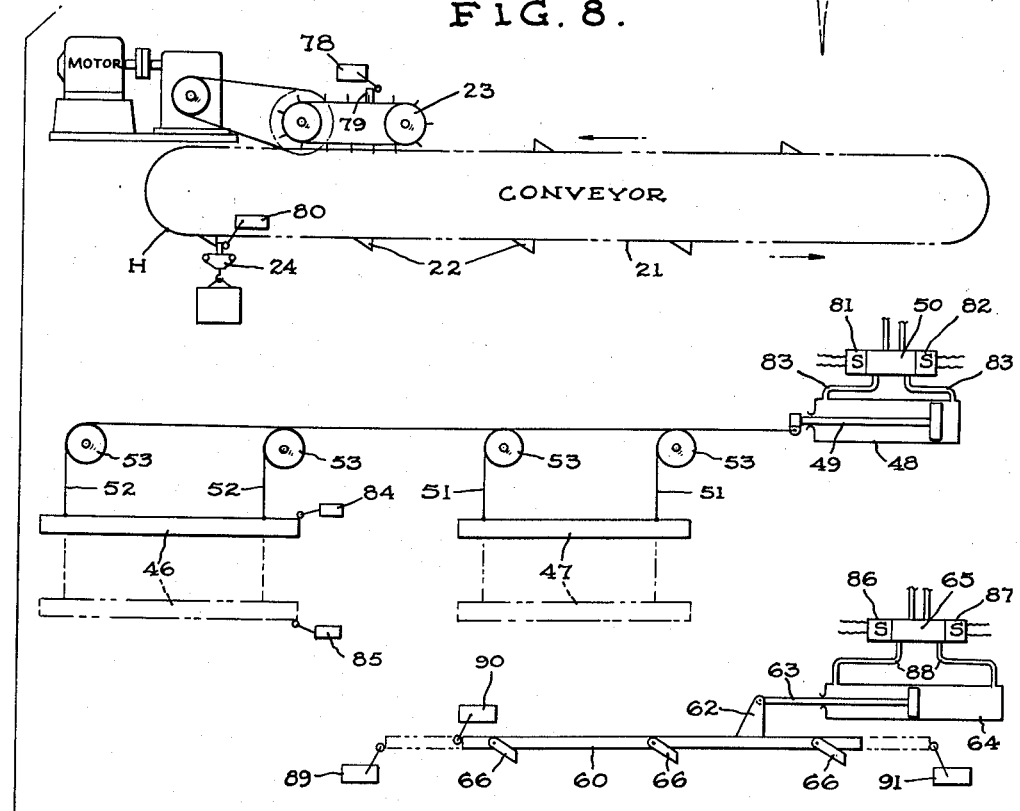

In the accompanying drawings, forming a part of this application, and in which like numerals are employed to designate like parts throughout the same, Figure 1 is a diagrammatic side elevation of a processing conveyor embodying the invention, Figure 2 is a diagrammatic plan view of the conveyor, Figure 3 is an enlarged side elevation of a fixed lower track section and associated pusher bar conveyor mounted upon a processing tank, Figure 4 is an enlarged transverse vertical section taken on line 4—4 of Figure 3, Figure 4a is a fragmentary vertical section taken on line 4a—4a of Figure 4, Figure 5 is an enlarged fragmentary plan view of sections of the conveyor tracks showing the relationship between a chain pusher lug, free trolley dog and a stop device, Figure 6 is a fragmentary side elevation of the elements shown in Figure 5, Figure 7 is a transverse vertical section taken substantially on line 7—7 of Figure 6, Figure 7a is a fragmentary perspective view of track sections showing further the relationship between a chain pusher lug, trolley dog and movable stop element, Figure 8 is a diagrammatic view of cyclic control elements of the conveyor, Figure 9 is a diagram illustrating the movement of all work units during one cycle of operation of the conveyor, Figure 10 is a chart of the movements of the main operating elements of the conveyor relative to one another during corresponding time increments within one complete cycle of operation, Figure 11 is a further diagram illustrating how the positioning of chain pusher lugs allows the chain to stop at random and to subsequently re-engage the work and advance it properly to the next work station when the chain is again activated, Figure 12 is a typical enlarged transverse vertical section through the conveyor tracks illustrating the means for suspending them from a ceiling or the like, Figure 13 is a further fragmentary vertical section similar to Figure 4, but with parts omitted for the purpose of simplification and illustrating a modification of the construction in Figure 4.

In the drawings, wherein for the purpose of illustration are shown preferred embodiments of the invention, the numerals 15 and 16 designate companion parallel tracks of the power and free type conveyor employed in the present invention. In the embodiment of the invention illustrated, the tracks 15 and 16 may be of generally conventional construction, and are preferably box-like in cross section, Figures 7 and 12, with continuous longitudinal slots 17 formed through their bottom sides, as shown. The tracks 15 and 16 are preferably arranged in side by side slightly spaced relation, at the same elevation, and the tracks are preferably supported or suspended at a desired elevation from the ceiling or some other suitable overhead support by bolt means 18, or the like, connected at 19 with track supporting brackets 20, arranged at desired intervals along the pair of tracks. The supporting means for the tracks 15 and 16 shown and described is substantially conventional and need not be dealt with in further detail.

The above-described side by side parallel track arrangement is designed for relatively light duty only, and I also contemplate employing an alternate heavy duty track construction, not shown, wherein the power track is supported above the free trolley track instead of in side by side relation with the same.

The innermost track 15, Figure 2, is the power track, which is continuous and unbroken, and supports a substantially conventional endless pusher type conveyor chain 21, preferably of a type presently manufactured by Richards-Wilcox Mfg. Co., Materials Handling Division, Aurora, Illinois. The chain 21 carries a plurality of equidistantly spaced depending pusher lugs 22, rigidly secured thereto and extending movably through the slot 17 of track 15. The chain 21 is preferably intermittently driven by a conventional chain drive power unit 23, which unit may be a standard unit presently manufactured by Richards-Wilcox Mfg. Co., Materials Handling Division, Aurora, Illinois. Since this drive unit is conventional and well known, it need not be described here in detail.

The outer track 16, Figure 2, is the usual free trolley track, containing and supporting a desired number of conventional carriages or free trolleys 24, having rollers 25 engaging the bottom web of the track 16, as shown. Each trolley 24 has a central depending extension 26 projecting movably through the slot 17 of track 16 and having secured thereto in further depending relation a suitable hook 27 for a work rack 28 which carries the work unit being processed along the conveyor.

Pivotally secured to each trolley extension 26 for horizontal swinging, just beneath the tracks 15 and 16 is a trolley dog 29, provided at its rear end with an upturned stop element 30 adapted to engage one side of the extension 26 for limiting the swinging movement of the trolley dog 29 in the clockwise direction, Figure 5. A retractile spring 31 has one end fastened to the extension 26 and its opposite end fastened at 32 to the dog 29, the spring serving to resiliently hold the trolley dog normally in the position shown in full lines, Figure 5. In such position, the forward end 33 of the trolley dog is normally in the path of travel of the chain pusher lugs 22, as shown. As long as the trolley dog 29 is in the full line position, Figure 5, the conveyor chain 21 will propel the particular trolley 24 along its track 16.

Directly below the trolley dog 29 upon each trolley is a flat washer 25' and a further washer or disc 26' of electrical insulating material. Below the insulating disc 26' is a laterally projecting horizontal contact arm 27', for a purpose to be described, and this contact arm is electrically insulated from the trolley 24 proper and trolley dog 29 and the two tracks 15 and 16. The work suspension hook 27 extends below the contact arm 27', as shown in the drawings.

Simplified means are provided at spaced intervals along the power track 15 to disengage the trolley dogs 29 from the chain pusher lugs 22 and thereby stop the trolleys 24 carrying the work at desired times. This means is preferably in the form of short depending stop elements or levers 34, pivoted intermediate their ends at 35 to the inside web 36 of a modified track supporting bracket 20', see Figure 7.

Each pivoted stop element 34 has a weighted generally horizontal extension 37 rearwardly of the pivot 35, and adapted to normally maintain the depending leading portion of the stop element 34 in the slightly elevated inclined position shown in full lines, Figure 6, due to gravity.

As each trolley 24 advances toward one stop element 34 under the pushing influence of a chain lug 22, the trolley dog 29 will initially contact the lower end portion of the stop element 34 while the latter is in its normally inclined position. Figures 6 and 7a. The trolley 24 and the dog 29 will continue to move forwardly a further slight amount and the spring 31 will not as yet yield and the trolley dog will shift the pivoted stop element 34 to the vertical position shown in broken lines, Figures 6 and 7a, wherein the stop element 34 constitutes a positive or rigid stop, and it is impossible for the element 34 to swing further under the influence of the trolley dog, due to contact of the extension 37 with a top lateral projection 37' of bracket 20'. When, as explained, the element 34 becomes a positive stop for the trolley dog 29, the latter will instantly stretch the spring 31 and be swung counterclockwise in Figure 5 from the full line to the broken line position of the trolley dog shown therein. The trolley dog 29 will then have its end 33 clear of the path of travel of the pusher lug 22, and this disconnects the free trolley 24 from the pushing conveyor chain 21 so that the trolley and work unit carried thereby will stop on the track 16.

To facilitate stopping each trolley 24 substantially instantly, there may be provided in the side of the trolley dog 29 facing the stop elements 34, a detent or notch 29', which the stop element 34 would engage automatically when the dog 29 is in the broken line position of Figure 5, and since the stop element 34 will then be in the vertical position forming a positive stop, the trolley 24 will come to rest upon the track 16 immediately. The detent 29' may be omitted if preferred and the trolley 24 will coast to a stop almost instantaneously, once the dog 29 is disengaged from the conveyor chain 21, because the linear speed of the trolley and conveyor chain is very slow in actual practice, and the slight coasting to a halt of the trolley would be immaterial to the proper functioning of the system. Additionally, if preferred, a slight detent, not shown, may be formed in the trolley track 16 for engagement with the rollers 25, in order to halt the trolleys at the desired points when the stops 34 disengage the trolley dogs 29 from the pusher lugs 22.

In conjunction with the above, a number of processing tanks 38, 39, 40, 41, 42, 43, 44 and 45 are arranged directly below one longitudinal run of the conveyor, Figure 2, and these tanks may vary in number and individual length depending upon the particular processing operations to be performed. For example, one intermediate tank 42 may be relatively long lengthwise of the conveyor and this tank may be an electroplating tank. The preceding tanks 38 to 41 may contain various baths or solutions within which the work units are dipped and then removed prior to advancing them into the plating tank 42 and these last-mentioned tanks may also vary in length, as shown. Likewise, the tanks 43, 44 and 45 following the plating tank 42 may contain various rinsing baths or the like for the work after plating, and these tanks may be of the same lengths or different lengths, depending upon the particular process being carried out by the use of the conveyor. The number and size of the tanks are variables, and tanks may also be arranged beneath the opposite or return run of the conveyor as illustrated by Figure 2, if required.

Above the tanks 38, 39, 40 and 41 and overhanging one end portion of the long tank 42, Figure 1, is a first vertically movable elevator track section 46, constituting a part or section of the free track 16. At the opposite end of the long tank 42 and partially overhanging same and arranged above the tanks 42, 43, 44 and 45, as shown, is a second elevator track section 47, which may be identical to the track section 46, and like the former constituting a vertically movable section of the otherwise fixed trolley track 16.

Means are provided to elevate and lower the track sections 46 and 47 in unison, comprising a horizontal double acting hydraulic cylinder 48 having a reciprocatory piston rod 49, adapted to be controlled by solenoid operated valve means 50, Figure 8, to be further described hereinafter. The cylinder 48 is fixedly secured in any suitable manner to the overhead support or ceiling as shown. Pairs of flexible cables 51 and 52 all have corresponding ends secured to the piston rod 49, Figure 1, and each cable engages a sheave 53, suitably journaled upon a fixed bracket 54 spaced above the tracks as shown. One sheave 53 is arranged near each end of an elevator track section, and the respective cables 51 and 52 pass about the sheaves 53 and have their ends secured at 55 to the elevator track sections 46 and 47. By means of this arrangement, the piston rod 49 may have imparted to it a desired amount of linear motion to pay out and draw back the suspension cables 51 and 52 in unison, for lowering and elevating the elevator track sections in unison. The track sections 46 and 47 may simply hang freely from the lower ends of the cables 51 and 52, and there is no necessity for positive vertical guide means for the elevator track sections during their vertical movement. Suitable adjustments, not shown, on the cables 51 and 52 will accurately align the elevator track sections with the remainder of the track 16 in the fully elevated position, Figure 1, and the length of stroke of the piston rod 49 which may be adjusted determines the extent of vertical movement of the elevator track sections.

Just above the plating tank 42 and extending lengthwise thereof for a major portion of its length is a relatively short horizontal fixed lower track section 56 adapted to have its ends aligned with the adjacent ends of the elevator track sections 46 and 47 when the latter are lowered, so that the free trolleys carrying work units may pass from the elevator track section 46, onto the fixed track section 56 and from such track section to the second elevator track section 47, as will be further described.

The fixed lower track section 56 is fixedly supported above the plating tank 42 and centrally thereof, Figure 4, by a plurality of transverse inverted U-shaped support members 57 having their lower ends rigidly secured at 58 to the top of the tank 42, Figure 4. A desired number of track supporting brackets 59, Figure 4, carried by the members 57, engage and support the track section 56 in the manner shown in the drawings. Track section 56 is identical in cross sectional shape with the free trolley track 16, so that it may readily receive and support the trolleys 24.

Associated with the fixed lower track section 56 is a horizontal reciprocatory pusher bar conveyor 60, shown diagrammatically in Figure 1 and illustrated particularly in Figures 3 and 4. The pusher bar conveyor 60 is slidably mounted upon and supported by suitable bracket means 61, dependingly rigidly secured to the support members 57, Figure 4, near one side of the track section 56 and at the elevation thereof. The pusher bar conveyor 60 is generally coextensive with the track section 56 and parallel thereto and movable longitudinally thereof. The pusher bar conveyor 60 has a transverse arm 62 rigid therewith for reciprocating it, and this arm is directly secured to the piston rod 63 of a conventional horizontal double acting hydraulic cylinder 64, controlled by solenoid operated valve means 65, Figure 8, to be further described. The arrangement is such that the piston rod 63 may shift the conveyor bar 60 in either direction longitudinally relative to the fixed track section 56.

The pusher bar conveyor 60 carries a plurality of longitudinally equidistantly spaced pusher pawls 66 pivoted near their upper ends at 67 to one side of the pusher bar 60, Figures 3 and 4. The pawls 66 have pushing ends 68 which are normally vertically disposed due to gravity, each pawl being provided near its upper end with a stop extension 69 adapted to engage a fixed stop 70 upon the pusher bar 60, Figure 3. When the pawls are in their positions of Figure 3 and the pusher bar 60 moves to the right under the influence of the piston rod 63, the vertical pushing ends 68 of the pawls 66 will engage the trolley dogs 29 of the trolleys which are upon the lower track section 56 and advance the trolleys step by step to the right, Figures 1 and 3, as will be further described. When the pusher bar 60 is shifted to the left in Figure 3, the inclined pawls 66 merely trip over or disengage the trolley dogs 29 so that trolleys 24 will not be moved to the left with the pusher bar. If desired, the pusher pawls 66 may be connected with springs arranged upon one side of their pivots to yieldingly hold them in trolley pushing positions but allowing the pawls to trip over the trolley dogs 29 upon the back stroke of the pusher bar 60. In this connection, any other preferred type of conveyor means found suitable may be employed to advance the trolleys 24 along the fixed lower track section 56, and the particular pusher bar conveyor 60 is merely one preferred embodiment of the conveyor means associated with the fixed lower track section 56.

As best shown in diagrammatic Figure 1, the pusher bar conveyor 60 is arranged for movement relative to the fixed lower track section 56 and relative to the elevator track sections 46 and 47 so that it may propel trolleys 24 from the adjacent end portion of the elevator track section 46 onto and across the track section 56 and then onto the adjacent end portion of elevator track section 47.

It might be mentioned here that the fixed section 71 of the free trolley track 16, directly above the lower track section 56, may be included in the track 16 as shown in Figure 1 or omitted entirely, if preferred. If included, the track section 71 may be used to bypass certain trolleys 24 with their work around the plating tank 42, which in some instances may be desirable. It should be obvious that where the track section 71 is omitted, the trolleys 24 and their work must pass over the fixed lower track section 56 in order to reach the portion of the track 16 beyond the plating tank 42.

With further reference to Figure 4 and also to Figure 4a, a desired number of electrical insulating pads 72 are mounted upon the outer face of the track supporting bracket means 59, and vertical bearings or guides 73 are in turn rigidly mounted upon the insulating pads 72 and electrically insulated thereby from the track section 56 and its supporting means. Vertical conductor rods 74 engage within the bearings 73, as shown, and have their upper ends connected with electric current carrying means 75, as shown in the drawings. The lower ends of the rods 74 are rigidly secured to a horizontal current conducting rail 76, extending adjacent to and just below the fixed track section 56, throughout the length of the same. The rail 76 is resiliently urged downwardly relative to track section 56 by coil springs 77 which are interposed between the bearings 73 and rail 76 and surounding the rods 74. The rail 76 is insulated from the track section 56 and its supporting means. As shown in Figures 4 and 4a, the lateral contact arm of each trolley 24 slidably engages the underside of the rail 76 and makes electrical contact therewith as the trolley is advanced by the pusher bar conveyor 60 through the plating tank 42. The arrangement is such that the work units suspended by the work racks 28 from the trolleys will be properly electrified so that the electroplating of the work may be accomplished within the tank 42 in a well-known manner.

It may be mentioned here that with the arrangement shown and described, the work to be plated within the tank 42 will be electrified throughout the length of the track section 56 having the rail 76 associated therewith. With the arrangement shown, the work will not be electrified at the extreme end portions of the tank 42 because the rail 76 is only coextensive with the track section 56. The track section 56 may, however, extend throughout the major portion of the length of the plating tank 42 and the latter may be of any desired length. If preferred, in order to electrify the work throughout the entire length of the tank 42, the adjacent end portions of the elevator track sections 46 and 47 can be electrified by means similar to those shown in Figures 4 and 4a, but not presently shown upon the drawings, for the purpose of simplification, and because the work electrifying means as shown are fully adequate.

A feature of the invention is the novel coaction of the pivoted stop elements 34 with the trolley dogs 29 as the elevator track sections 46 and 47 are raised and lowered. The stop elements 34 are arranged substantially at the longitudinal centers of the tanks 38 to 41 and 43 to 45, as shown diagrammatically in Figure 1. Accordingly, when each stop element 34 engages a trolley dog 29 to disconnect the same from the pusher lug 22 for stopping the particular trolley 24, this trolley with its work unit will be directly above the center of a particular one of the above-mentioned processing tanks. The several trolleys 24 carrying work units will be positioned upon the elevator track sections 46 and 47 when they are stopped by the elements 34 and they will be in proper position to be lowered into the several tanks directly below, Figure 1.

With reference to Figures 6 and 7a, the initial engagement of each trolley dog 29 with a pivoted stop element 34 will cause the latter to swing from its normally inclined position to the vertical positive stop forming position, shown in broken lines. During this small distance of travel upon the track 16, the trolley dog 29 will not be pivoted or moved from engagement with the chain pusher lug 22, since the spring 31 is strong enough to prevent this. However, when the stop element 34 reaches the vertical position, it becomes a rigid stop and the trolley dog 29 can move no further along the track 16 and the spring 31 yields and allows disengagement of the dog 29 from the pusher lug 22. The rigid stop 34 first engages the forward diagonal edge of the trolley dog 29, Figure 5, and begins to swing the trolley dog counterclockwise toward the broken line position, and this will substantially instantly move the end 33 free of the pusher lug 22. Substantially simultaneously, the stop 34 will enter the notch 29' on the trolley dog and bring the trolley 24 to a halt substantially directly above the longitudinal center of one of the processing tanks shown in Figure 1. It should be understood that the several trolleys upon the elevator track sections 46 and 47 will be similarly stopped substantially simultaneously by the other stop elements 34.

The hydraulic cylinder 48 is now operated to lower the elevator track sections 46 and 47 with their supported trolleys 24 and work units, and subsequently, when the elevator track sections are again raised by the cylinder 48 to the elevated positions of Figure 1, the pivoted stop elements 34 will have returned automatically by gravity to their inclined positions, Figures 6 and 7a, and the ascending trolley dogs 29 which in the meantime have returned to the full line position of Figure 5, in the path of travel of the pusher lugs 22, will be clear of or on the forward sides of the now inclined stop elements 34, and the latter will not prevent the continued forward movement of the trolleys 24 due to the re-engagement of the moving lugs 22 with the trolley dogs 29. In other words, even though the track sections 46 and 47 and the trolleys and trolley dogs carried thereby are moved vertically downwardly and upwardly without forward or longitudinal movement, the trolley dogs 29 will have passed forwardly of the inclined stop elements 34 when re-elevated, due to the rearward movement of the stop elements 34 due to gravity, relative to the trolley dogs 29. Without this unique arrangement of the pivoted stop elements 34 and associated parts, above described, the track sections 46 and 47 would merely be lowered and elevated with the trolley dogs 29 in the same relative positions with respect to the stops 34, before and after the elevator action, and the stop elements 34 would prevent continued forward movement of the trolleys by the conveyor chain. It will be further understood that the stop elements 34 are located upon the power track 15 only at the several tanks or work stations, and the number and spacing of the elements 34 will depend upon the number, spacing and lengths of the tanks, as one stop element will be located at or near the longitudinal center of each tank, as stated.

Another feature of the construction is that the spacing of the chain pusher lugs 22 is such that it matters not what the position of the conveyor chain 21 is relative to the elevator track sections 46 and 47 or to the trolleys, when the chain is brought to a halt at the end of each cycle of operation. The spacing of the pusher lugs 22 is such that no means are needed, such as brakes, to check the movement of the chain at a precise position, and the chain 21 may stop at random positions and there will always be a pusher lug 22 properly positioned to engage or re-engage a particular trolley dog 29 for properly advancing the work from one tank or work station to the next during one cycle of operation or one increment of chain travel, notwithstanding variable distances between certain processing tanks, tanks of varying lengths longitudinally of the tracks, chain tolerance variations, stretch and the like.

With reference to Figure 8, conventional electric circuit control means is employed for operating the three main movable elements of the system, namely, the conveyor chain 21, the elevator track sections 46 and 47 and the pusher bar conveyor 60. In Figure 8, elements of the control system necessary to a proper understanding of the operation and timing of the moving elements are shown, but for the purpose of simplification, details of the electrical control circuit including relays and the like are omitted, such parts being entirely conventional and well-known. In Figure 8, the conveyor chain 21 is diagrammatically shown with its drive unit 23 of conventional construction. A conveyor chain stop limit switch 78 is associated with the drive unit 23 so that a moving part 79 of the latter will actuate the switch 78 to stop the chain 21 at the end of each cycle of operation. There is also a home limit switch 80 associated with the conveyor chain 21 and positioned to be actuated by a part of one trolley 24, in series with the switch 78 at a different time during the cycle of operation, for returning certain work units which are already fully processed to the home or starting station H of the conveyor during the time that the relatively long immersion time of each cycle takes place.

With continued reference to Figure 8, the double acting cylinder 48 for the elevator track sections 46 and 47 is associated with a conventional solenoid operated control valve 50 having a pair of solenoids 81 and 82, and pipes 83 leading to the opposite ends of the cylinder 48 upon opposite sides of the piston therein. An elevator up limit switch 84 is provided to be actuated by one elevator track section, which may be the track section 46, near the upper end of its vertical travel. An elevator down limit switch 85 is likewise positioned to be actuated by the elevator track section 46 near the lower end of its vertical travel. It is unnecessary to employ additional up and down limit switches for the elevator track section 47, since both elevator track sections move in unison because of their common connection with the piston rod 49.

The pusher bar conveyor cylinder 64, Figure 8, is connected with the solenoid operated valve 65, similar to the valve 50 and having a pair of solenoids 86 and 87 and pipes 88 leading into opposite ends of the cylinder 64, whereby movement of the piston rod 63 in either direction can be effected. A pusher bar reverse limit switch 89 and a pusher bar park limit switch 90 are provided adjacent the pusher bar 60 to be actuated by its trailing end for limiting its movement in the reverse direction and to stop the pusher bar 60 midway of its return travel so both ends of the bar 60 will clear the work units moving up or down with the elevator track sections 46 and 47. Likewise, a pusher bar forward limit switch 91 is provided and is engaged by the forward extremity of the pusher bar to limit its stroke in the forward direction.

During the operating cycle, the limit switch 85 is actuated by the elevator track section 46 in the lowered position to start the conveyor chain 21 forwardly on the long return trip to the starting or home station H, Figure 2. The purpose of this long run of the conveyor chain is to take advantage of the relatively long time during which the elevator track sections are lowered and the trolleys carried thereby are free from engagement with the chain 21, to convey back to the home station work units on the track 16 which have already passed beyond the tank 45 and the forward end of the elevator track section 47. In this manner, it is unnecessary to have all of the completely processed work units accumulated upon the back run 92 of the conveyor track, and a number of units may be returned by the chain to the home station H while the elevator track sections are lowered. On the other hand, if it is desired to utilize the back run 92 for storing processed work or for other operations, the long return movement of the chain 21 may be eliminated from the operating cycle. Alternatively, the chain 21 could run continuously, and additional stop elements 34, not shown, could be arranged along the back run 92 of the conveyor and at the home station H.

The elevator down limit switch 85 also serves to start the pusher bar conveyor 60 upon its forward stroke or to the right, Figures 3 and 8, for the purpose of advancing one trolley 24 and its work unit from the forward end portion of elevator track section 46 to the initial or rearmost station within the plating tank 42, which is the left hand end portion of the tank 42 in Figure 1. The rearmost pusher pawl 66 of the bar 60 will engage the trolley dog 29 of the right hand endmost trolley 24 on the elevator track section 46, while the latter is lowered, to advance the particular trolley one step into the tank 42 and onto the rear end portion of the fixed lower track 56. When this occurs, the pusher bar forward limit switch 91 will start the reverse stroke of the pusher bar 60. The home limit switch 80 will next stop the forward movement of the conveyor chain 21 upon its long return trip, and the limit switch 80 will simultaneously start the elevator track sections 46 and 47 upon their upward travel. The limit switch 90 will interrupt the return stroke of the pusher bar 60 at the midpoint of the return stroke so that both ends of the bar 60 will clear the ascending work units upon the elevator track sections. After this takes place, the elevator up limit switch 84 will stop the upward travel of the track sections 46 and 47 and simultaneously start the conveyor chain 21 forwardly upon its regular cycle of operation. The pusher bar 60 remains parked or stationary until the elevator track sections descend, after which the switch 85 starts the pusher bar 60 again so that it may complete its reverse movement to the left, Figure 8.

The minimum movement of the chain 21 during its regular cycle of operation is equal to the maximum distance between the center lines of any two adjacent tanks 38, 39, 40, 41 or 43, 44 and 45, plus the minimum distance between any two of the racks in tank 42. All of the work racks 28 and their trolleys will now advance one predetermined distance for moving the work to the next station, and due to the spacing of the pusher lugs 22 and stop elements 34, each work unit is advanced exactly the proper distance during the cycle of operation of the chain 21, to position it over the center of the next tank, even though adjacent tanks have different lengths longitudinally of the chain. It will be noted that this cyclic movement of the chain 21 from work station to work station is an entirely different movement from the mentioned long return trip of the chain to the home station H while the track sections 46 and 47 are lowered and free of the influence of the chain 21. It is only then that the chain conveys certain of the completely processed work units along the back run 92 to the home station H. The intermittent or cyclic movement of the chain 21 occurs when the track sections 46 and 47 are elevated, and the distance then traversed by the chain is then always the same, as previously mentioned. When the chain 21 has completed one cycle of movement between two adjacent work stations, the conveyor stop limit switch 78 stops the forward movement of the chain 21 and the above cycle of operation is repeated any desired number of times.

Reference is now made to Figures 9 and 10, which are charts illustrating the above cycle of operation and the movements of the conveyor components at given times. In Figure 9, there is shown a first or starting position for work units numbered 1 to 11 corresponding to their positions shown for illustrative purposes in Figure 1. After one cycle of operation of the chain 21, the work units are in the second position, Figure 9, the limit switch 84 having started the conveyor chain forwardly for its regular cyclic distance, and the work units 1 to 5 and 8 to 11 being advanced one work station. The two units 6 and 7 in the lowered position, free of the conveyor chain, are in the plating tank 42 and the immersion time of each unit in the tank 42 may be approximately equal to three cycles of operation of the chain 21, although this may be varied.

In the third position, Figure 9, the elevator track sections 46 and 47 have moved downwardly and the work unit 5 has now entered the plating tank 42 and is ready to be advanced with the work units 6 and 7 by the pusher bar conveyor 60. The work unit 11 remains elevated, because it is already beyond the second elevator track section 47 and in position for the long return trip on the back run 92 to the home station while the other work units are lowered. This action is shown diagrammatically in the fourth position, Figure 9, wherein the work unit 11 is traveling home, the elevator down limit switch 85 having started this action. The limit switch 85 now also starts the pusher bar conveyor 60 upon its forward stroke to advance the work units 5, 6 and 7 one station to the right in the plating tank 42. In the fifth position of Figure 9, the work unit 11 has reached home station H and work units 1 to 4 and 7 to 10 are now elevated to the conveyor track level with the elevator track sections 46 and 47, the home limit switch 80 having started the elevator track sections upwardly and the elevator up limit switch 84 stopping the upward movement of the elevator track sections and also again starting the conveyor chain 21 upon its next regular cycle of operation. A comparison of the first and fifth positions of the work in Figure 9 shows that the same arrangement of work units relative to the tanks prevails, except that each work unit is advanced one station and the last work unit 11 is returned to the home station.

The chart of Figure 10 is used to determine relative movements of the three main moving elements of the conveyor system at any given time during the cycle of operation and corresponding to the five positions of the work in Figure 9. Figure 10 thus shows the movements of the elevator track sections relative to the conveyor chain 21 and relative to the pusher bar conveyor 60 at any given instant. In Figure 10, the conveyor chain 21 advances one cycle or work station at 93 while the elevator track sections 46 and 47 are up and the pusher bar 60 is idle. The elevator track sections move downwardly at 94 after the conveyor chain is stopped and while the pusher bar 60 is idle. The pusher bar 60 then advances the work within the plating tank 42 one station at 95, Figure 10, while the elevator track sections are lowered, and at this time, the conveyor chain may be driven, if desired, during the entire immersion time in the tanks to return the work unit 11 to the home station H as shown at 96 in Figure 10. The pusher bar 60 will also retract as at 97 during this time interval and the midway parking or dwelling point of the pusher bar is indicated at 98, as caused by the limit switch 90. Finally, in Figure 10, the elevator track sections 46 and 47 will travel upwardly at 99 while the conveyor chain 21 is idle and the pusher bar 60 is also idle to complete the cycle of operation.

Figure 11 is a further chart showing how the positioning of the chain pusher lugs 22 enables the chain 21 to stop at random, without regard to the location of the trolleys and their work units or processing tanks; and to then pick up and advance the trolleys properly to the next work station when the chain 21 is again activated. Because each trolley 24 is released from the chain pusher lug 22 when its dog contacts a stop element 34', the work units can only travel the various distances between the stop elements 34, but the chain 21 always continues to travel the maximum distance between any two work stations, which will be the distance between the center lines of the tanks 39 and 40, Figure 1, the two longest tanks other than the plating tank 42. With continued reference to Figure 11, the maximum work space is thirty inches, the greatest distance traveled by a work unit when passing from the center of tank 39 to the center of tank 40. If added to this is the minimum work space of twenty-one inches (also the distance between the pusher lugs 22 of the chain), the total conveyor chain travel per cycle of operation will be fifty-one inches, as indicated in Figure 11.

The reason for this relation is that when a chain pusher lug 22 happens to lie just ahead of the work unit, as at X in Figure 11, it will miss this work unit and the next following lug 22, spaced twenty-one inches from it to the left, will have to pick up this work unit 4 and advance it a maximum distance of thirty inches; thus, thirty inches plus twenty-one inches equals fifty-one inches. Also, the work units can never be closer to each other than the pusher lug spacing of twenty-one inches and this will prevent them from striking each other or interfering upon the conveyor. It should now be obvious that it matters not where the pusher lugs 22 are located when the conveyor chain 21 starts or stops, since the latter will advance all work units the various required distances without confusion or interference.

The dimensions used in Figures 1 and 11 and discussed above, are merely for the purpose of illustration, and may obviously be varied in practice as desired, and are not to be considered in any limiting sense in this application.

In Figure 13, there is illustrated a slight modification of the invention, wherein the work electrification elements of Figures 4 and 4a, have been omitted. In some instances, it may be desirable to omit the electrification of the work, as where other than electroplating processes or the like are being performed; it being entirely feasible to utilize the conveyor for a wide variety of processing operations. Figure 13 is identical with Figure 4 except that the elements 26', 27' and 72 through 77 have been omitted. Illustration of the cylinder 64, pusher bar 60 and associated elements has also been omitted in Figure 13 for the purpose of simplifying the drawings, since these elements, if shown, would merely be duplicating Figure 4. All other parts of the parts of the system not shown in Figure 13 are identical to those shown and described in connection with Figure 4 and the first form of the invention generally.

We wish to point out additionally that the work electrifying means shown in Figures 4 and 4a is merely one preferred arrangement or construction, and the means for conducting current to the work during electroplating or the like may be varied as found desirable, depending for example upon whether light work or heavy work is being handled by the conveyor.

It should also be pointed out that the pivoted stop elements 34 can be located at points other than at the elevator track sections or adjacent to the processing tanks. For example, additional stop elements can be located on the return side of the conveyor, for inspection or other operations, instead of the long trip to the home station when the elevators are down, as previously described.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described our invention, we claim:

1. In processing conveyor apparatus, a pair of companion conveyor tracks, a power-operated conveyor element movable upon one track and including spaced pusher elements, a plurality of free trolleys movable upon the other track, each trolley having a movable trolley dog engageable with one pusher element for propelling the trolley upon said other track, an elevator track section in said other track and adapted to receive a plurality of the trolleys, means for lowering and elevating the elevator track section while said trolleys are upon the same, and a plurality of stop elements pivotally connected with said one track having the conveyor element and disposed in the path of travel of the trolley dogs and engageable with the same to disconnect the trolleys from the conveyor element and to stop them upon the elevator track section.

2. In processing conveyor apparatus, companion power and free trolley conveyor tracks, a power-operated conveyor chain movably engaging the power track and including spaced pusher elements, a plurality of free trolleys adapted to carry work units movably mounted upon the free trolley track, a movable trolley dog pivoted to each trolley and disposed normally in the path of the chain pusher elements for engagement with one such element, and a plurality of spaced stop elements pivotally mounted upon the power track in the path of travel of the trolley dogs and engageable with the same to shift the trolley dogs free from engagement with the pusher elements and thereby stop the trolleys.

3. In processing conveyor apparatus, companion power and free trolley tracks, a conveyor chain movably engaging the power track and including substantially equidistantly spaced pusher elements, a plurality of free trolleys movable upon the free trolley track, a movable trolley dog carried by each trolley and disposed normally in the path of movement of the pusher elements to be engaged by one such element, an elevator track section in the free trolley track adapted to receive a plurality of the trolleys, means for lowering and elevating the elevator track section with the trolleys upon the same, and a plurality of movable stop elements connected with the power track and spaced apart lengthwise thereof and being adjacent the elevator track section and arranged in the path of travel of the movable trolley dogs, said stop elements engaging the trolley dogs when the stop elements are in a first position and being moved by the trolley dogs to a positive stop forming position and then moving the trolley dogs in a direction for disengaging them from said pusher elements to stop the trolleys, said stop elements returning automatically to said first position upon disengagement with the trolley dogs due to lowering of the same with the elevator track section and thereby enabling the trolley dogs to be positioned in advance of the stop elements for continued movement with the conveyor chain when the elevator track section is re-elevated.

4. Processing conveyor apparatus comprising companion power and free trolley tracks, a conveyor chain movable upon the power track and including trolley pushing means, a plurality of free trolleys mounted to travel upon the free trolley track and having parts to be engaged by the pushing means, a pair of elevator track sections in the free trolley track and spaced apart longitudinally and adapted to receive a plurality of the free trolleys thereon, means engaging said trolley parts for disconnecting them from said pushing means to stop the trolleys upon the elevator track sections, means for lowering and re-elevating the elevator track sections substantially in unison, said pushing means re-engaging the trolley parts after they are re-elevated and continuing to advance the trolleys upon the free trolley track, a fixed lower track section for alignment with ends of the elevator track sections when the latter are in the lowered position and adapted to receive and support the trolleys, and separate conveyor means associated with said lower track section for conveying the trolleys from one elevator track section to the other elevator track section while such track sections are lowered.

5. Processing conveyor apparatus comprising companion power and free trolley tracks, a conveyor chain movable upon the power track and including trolley engaging means, a plurality of free trolleys mounted to travel upon the free trolley track and engaged by the pushing means, a pair of elevator track sections in the free trolley track and spaced apart longitudinally and adapted to receive a plurality of the trolleys, means for lowering and elevating the elevator track sections, means to effect disengagement of the trolleys and pushing means to stop the trolleys upon the elevator track sections, there being a series of processing chambers below the elevator track sections and a relatively long processing chamber below the elevator track sections and in the region between them, a fixed lower track section adjacent the relatively long processing chamber and adapted for alignment with adjacent ends of the elevator track sections when the latter are lowered with their trolleys, and reciprocatory conveyor means associated with said fixed lower track section to engage the endmost trolley upon one elevator track section and advance the same through the relatively long processing chamber and to also transfer a trolley from the fixed lower track section to an endmost position upon the other elevator track section near the opposite end of said relatively long chamber.

6. In processing conveyor apparatus, companion power and free trolley tracks, a conveyor chain movably engaging the power track and having spaced pusher elements, a plurality of free trolleys movably mounted upon the free trolley track and having trolley dogs for engagement with the pusher elements, a pair of elevator track sections constituting parts of the free trolley track and spaced apart longitudinally and adapted to receive a plurality of the trolleys, means for lowering and elevating the elevator track sections, stop means associated with the power track and engaging the trolley dogs to disconnect them from said pusher elements and thereby stop the trolleys upon the elevator track sections, a fixed lower track section arranged between the elevator track sections and adapted for alignment with the latter when they are lowered with their trolleys, a reciprocatory pusher bar associated with said lower track section, a plurality of pushing pawls carried by the pusher bar and engageable with said trolley dogs to advance the trolleys step by step from one elevator track section to the fixed lower track section and then on to the other elevator track section, and means to reciprocate said pusher bar while the elevator track sections are lowered.

7. Processing conveyor apparatus comprising companion power and free trolley tracks, a conveyor chain movably engaging the power track and having spaced pusher elements, free trolleys movably mounted upon the free trolley track and having trolley dogs to be engaged and pushed by the pusher elements, a pair of longitudinally spaced elevator track sections in the free trolley track adapted to receive a plurality of the free trolleys, spaced stop elements carried by the power track adjacent to the elevator track sections and engaging the trolley dogs to disconnect them from the pusher elements and stop the trolleys upon the elevator track sections, power-operated means connected with the elevator track sections to raise and lower the same in unison, a fixed lower track section spaced below said companion tracks and adapted for alignment with the elevator track sections when the latter are lowered, a reciprocatory pusher bar arranged adjacent to said fixed lower track section and having a plurality of pusher pawls to engage said trolley dogs and advance the trolleys on one elevator track section on to and across the fixed lower track section and then on to the other elevator track section, means connected with the pusher bar to reciprocate it, and a series of processing tanks arranged below the elevator track sections and fixed lower track section, said series including a relatively long processing tank adjacent the fixed lower track section and being in underlying relation with end portions of the elevator track sections.

8. Processing conveyor apparatus comprising companion power and free trolley tracks arranged in substantially parallel side by side relation, a movable conveyor element mounted upon the power track and having a pusher element, a trolley device adapted to support a work unit movably mounted upon the free trolley track, a trolley dog pivotally secured to said trolley device, a spring connected with the trolley dog to resiliently hold it normally in the path of said pusher element for engagement therewith and yieldable to allow disengagement of the trolley dog and pusher element, a stop element pivotally mounted upon the power track and being in the path of travel of the trolley dog and engageable therewith to disconnect the trolley dog from the pusher element, the trolley dog having a detent part to receive the stop element after the trolley dog is disengaged from the pusher element so that the stop element will then stop the trolley device upon the free trolley track.

9. In processing conveyor apparatus, companion power and free trolley tracks, a power-driven conveyor element carried by the power track and having spaced pusher elements thereon, free trolleys carried by the free trolley track and movable along the same, a trolley dog movably secured to each free trolley, a spring connected with the trolley dog to resiliently hold it normally in the path of the pusher elements and yieldable to allow the trolley dog to be shifted from such path, and a plurality of stop elements carried by the power track and spaced longitudinally thereon and arranged in the path of movement of the trolley dogs for engagement therewith to disconnect the trolley dogs from said pusher elements and thereby stop the trolleys.

10. In processing conveyor apparatus as defined by claim 9, each of said trolley dogs having a detent element for positive engagement with one of said stop elements after the latter has shifted the trolley dog from the path of travel of the pusher elements to thereby stop the movement of the free trolley.

11. In processing conveyor apparatus, companion power and free trolley tracks, a power-driven conveyor element carried by the power track and having spaced pusher elements thereon, free trolleys carried by the free trolley track and movable upon the same, a trolley dog movably secured to each free trolley, a spring connected with the trolley dog to resiliently hold it in the path of travel of the pusher elements, a plurality of stop elements pivotally mounted upon the power track and spaced apart longitudinally thereon and being in the path of travel of the trolley dogs, each pivoted stop element being weighted to normally assume a first position wherein it initially engages one of the trolley dogs and is shifted by the latter to a second positive stop forming position without moving the trolley dog, the trolley dog being moved clear of the path of the pusher elements by the pivoted stop element when the latter reaches said positive stop forming position, each stop element adapted to return automatically by gravity to said first position.

12. Processing conveyor apparatus comprising companion power and free trolley tracks, a conveyor chain movably carried by the power track and having spaced pusher lugs, free trolleys movably mounted upon the free trolley track and having trolley dogs extending in the path of travel of the pusher lugs to be engaged thereby, a pair of elevator track sections in the free trolley track and spaced apart longitudinally and adapted to receive the free trolleys, a plurality of stop elements secured to the power track in longitudinally spaced relation adjacent to the elevator track sections and arranged in the path of travel of the trolley dogs to engage the same and disconnect them from the pusher lugs while the trolleys are on the elevator track sections and thereby stopping the trolleys, power-operated means connected with the elevator track sections to raise and lower the same, a plurality of work processing tanks arranged below the elevator track sections and stop elements to receive work units carried by the trolleys on the elevator track sections when the latter are lowered, an intermediate processing tank arranged below the companion tracks in the region between the elevator track sections and having portions underlying both of said elevator track sections, a fixed lower track section disposed near the top of said intermediate tank and adapted for alignment with the elevator track sections when they are lowered so as to form therewith a substantially continuous lower track upon which the free trolleys may travel, separate conveyor mechanism connected with said fixed lower track section for propelling the trolleys from one elevator track section to the fixed lower track section and then to the other elevator track section, said separate conveyor mechanism including elements for engagement with said trolley dogs to facilitate propelling the trolleys.

13. Processing conveyor apparatus according to claim 12, and means associated with the fixed lower track section for electrifying the work units carried by the trolleys while they are traveling upon the fixed lower track section.

14. Processing conveyor apparatus according to claim 12, wherein said power-operated means comprises cables connected with and supporting the elevator track sections and a reciprocatory element connected to all of the cables for pulling them in one direction in unison.

15. Processing conveyor apparatus comprising companion power and free trolley tracks, a power-operated conveyor chain mounted for movement upon the power track, a plurality of pusher lugs secured to said chain and spaced equidistantly longitudinally of the chain, a plurality of free trolleys mounted to travel upon the free trolley track, each trolley adapted for engagement by one of said pusher lugs so as to be propelled thereby, a plurality of work processing tanks positioned below said tracks and being of unequal length longitudinally of the tracks so that the distance between the longitudinal centers of adjacent tanks varies, elevator track sections arranged in the free trolley track and adapted to support a plurality of the free trolleys above the processing tanks, means to stop the trolleys upon the elevator track sections, and means for lowering and re-elevating the elevator track sections so that work units carried by the trolleys may be processed in said tanks and subsequently conveyed further along the free trolley track by said equidistantly spaced pusher lugs without confusion.

16. Processing conveyor apparatus comprising power and free trolley tracks, a power-operated conveyor chain movably mounted upon the power track, a plurality of equidistantly spaced pusher lugs carried by said chain, a plurality of free trolleys adapted to carry work units mounted to travel upon the free trolley track, each trolley adapted for engagement by one of said pusher lugs so as to be propelled thereby, a plurality of work processing tanks arranged below said tracks and being spaced unequally lengthwise of the tracks, an elevator track section arranged in the free trolley track and adapted to receive and support a plurality of the free trolleys, means to stop the free trolleys upon the elevator track section while they are positioned substantially directly over said unequally spaced tanks, and means for lowering and re-elevating the elevator track section for processing the work units within the tanks and subsequently conveying them further upon the free trolley track, the arrangement being such that the equidistantly spaced chain pusher lugs will re-engage the trolleys upon the re-elevated elevator track section and advance them without confusion regardless of the positions of the chain pusher lugs relative to the unequally spaced tanks at the time that said lugs are stopped.

References Cited in the file of this patent

UNITED STATES PATENTS

| | | |
|---|---|---|
| 2,048,937 | Larsen | July 28, 1936 |
| 2,650,600 | Davis | Sept. 1, 1953 |